May 26, 1970            G. STARK ET AL          3,514,390
ELECTRODE DEVICE FOR ELECTROCHEMICAL FORMING OF
UNOBSTRUCTED RECESSES IN METALLIC WORKPIECES
Filed Oct. 2, 1967
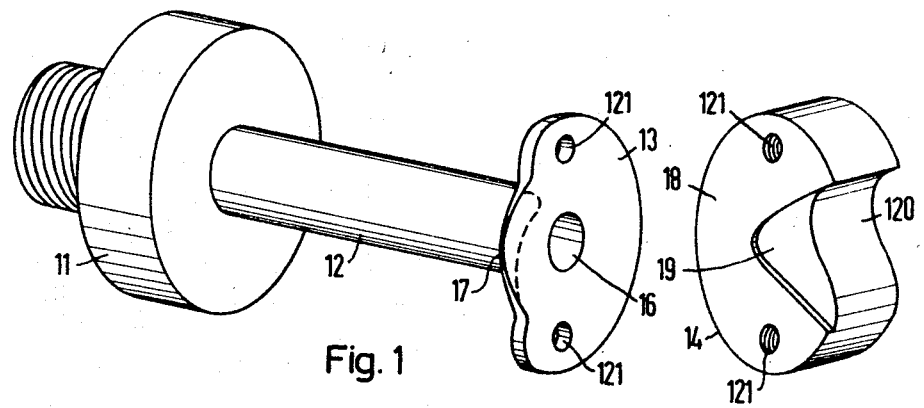
Fig. 1
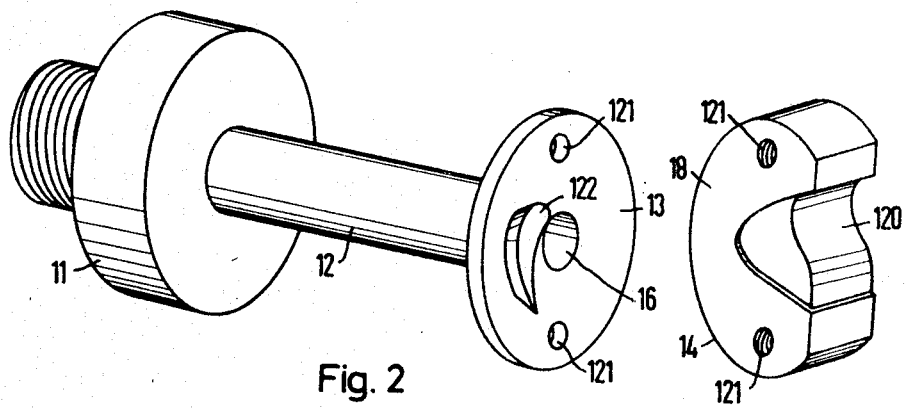
Fig. 2
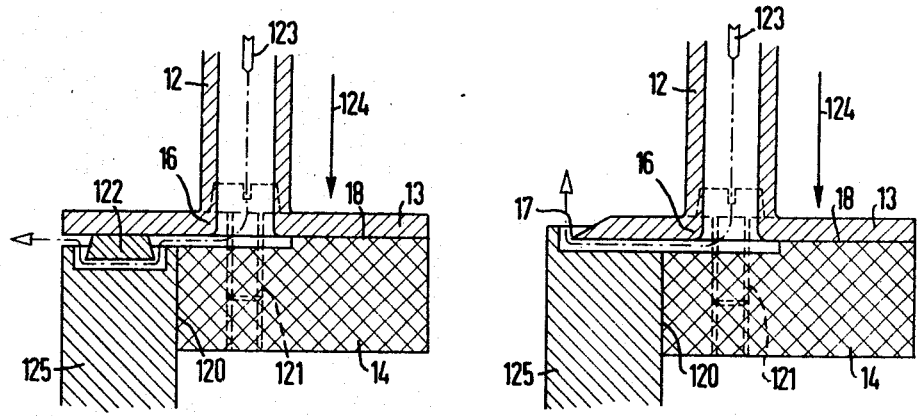
Fig. 4                    Fig. 3

United States Patent Office

3,514,390
Patented May 26, 1970

3,514,390
ELECTRODE DEVICE FOR ELECTROCHEMICAL FORMING OF UNOBSTRUCTED RECESSES IN METALLIC WORKPIECES
Gustav Stark and Klaus Otto, Nuremburg, Germany, assignors to Siemens Aktiengesellschaft, a corporation of Germany
Filed Oct. 2, 1967, Ser. No. 672,150
Int. Cl. B23p 1/00
U.S. Cl. 204—284   3 Claims

ABSTRACT OF THE DISCLOSURE

An electrode for electrolytically providing workpieces with recesses free of residual center pins, bridges or the like obstructions, is composed essentially of a shank which carries a fastening flange at one end and the active electrode foot at the other end. The shank is tubular to serve as a duct for supplying the electrolyte during the forming operation. The electrode foot and the workpiece form an intermediate gap traversed by the electrolyte which dissolves material from the cathodically connected workpiece and thus produces a recess whose shape corresponds to that of the electrode foot. The electrode is further equipped with an electrolyte guide structure of electrically non-conducting material which is attached face-to-face to the foot and has a recess communicating with the tubular shank to continuously pass electrolyte through the active gap. The depth of the recess in the advancing direction of the electrode is at least equal to the width of the working gap.

---

Our invention relates to the electrochemical forming of metallic workpieces with the aid of a tool electrode which during operation is gradually advanced relative to the workpiece while an electrolyte, usually an aqueous solution, is passed at rather high speed through the narrow working gap between the electrode and the workpiece. With the tool electrode connected anodically and the workpiece cathodically, the electrolyte dissolves material from the workpiece so that the workpiece is "machined" in accordance with the contour of the electrode.

When applying the electrochemical forming method (EC-method) to the production of shaped cavities and other recesses in metallic workpieces with the aid of the conventionally employed tubular electrodes, there remain residual amounts of material inside the cavity or other hollow, usually in the shape of a central pin, a bridge or the like obstruction. It has been found particularly that, on account of the difficulty of properly guiding the electrolyte at sharp corners, for example in the production of straddling ridge seals for turbine blades, the corner or point of the recess that corresponds to the tear-off edge of the turbine blade must be rounded; but this undesirably thickens the ridge seal. The burr occurring at the entering locality of the electrolyte at small blade profiles coalesces with the ridge seal and thereby also causes an undesired thickening of the ridge seal. Furthermore, unilateral ridge seals could not be produced with the electrochemical tool electrodes heretofore available.

It is an object of our invention to overcome these difficulties.

More specifically, it is an object of the invention to afford an EC-production of unilateral ridge seals at turbine blades, as well as the EC-production of straddling seals that possess sharp points or edges and are free of obstructing pin-like or bridge-like obstructions.

Still another object of the invention, in conjunction with those mentioned, is to provide for easy adjustability of the electrochemical tool electrode relative to the workpiece during the electrode advancing travel.

According to our invention we provide an electrochemical tool electrode with a tubular shank portion which carries at one end a fastening means, such as the conventional flange for attaching the electrode to a mounting head, and has a metallic electrode foot located on the other end, this foot constituting the electrolytically active part of the tool electrode. According to an essential feature of our invention, we provide such a tool electrode adjacent to the working area of the electrode foot with an electrolyte guide structure of electrically non-conducting material and provide the guide structure at its face adjacent to the electrode foot with a cavity or recess that is open toward the workpiece and whose depth is at least equal to the width of the electrolytic working gap existing between electrode and workpiece during the electrolytic forming operation.

According to another feature of our invention, the guide structure has a lateral surface which is adjacent to a corresponding surface portion of the workpiece and is shaped in adaptation to the latter surface portion, these surfaces extending parallel to the tool advancing direction of the electrode.

The invention will be further described with reference to embodiments thereof illustrated by way of example on the accompanying drawing in which:

FIG. 1 is a perspective view of an electrode device according to the invention designed for the production of unilateral ridge seals at turbine blades, the electrolyte guide structure being shown separately from the electrode foot.

FIG. 2 shows in perspective an embodiment designed for the production of straddling ridge seals, the illustration being otherwise similar to that of FIG. 1.

FIG. 3 is an axial section of an electrode device according to FIG. 1 and of a workpiece being processed.

FIG. 4 shows in axial section a tool electrode according to FIG. 2 together with a workpiece being electrochemically machined thereby.

The same reference numerals are used in the various illustrations for denoting corresponding items respectively.

Relating to FIGS. 1 and 3, there is shown a tool electrode according to the invention applicable for producing unilateral ridge seals at turbine blades. The electrode comprises a mounting flange 11 on a tubular shank 12 whose axis extends in the tool-feed direction and which forms an inlet tube for supplying electrolyte during operation of the device. Mounted at the active end of the tubular shank 12 is an electrode foot 13 which has a planar base surface contoured in accordance with the shape of the workpiece. An electrolyte guide structure 14 has a planar surface attached to the foot portion 13 in face-to-face relation thereto. The tubular shank 12 and the foot 13 are joined together at 16. The metallic electrode foot 13 is especially designed for producing unilateral ridge seals. For this purpose it has a profiled side 17 shaped according to the desired seal configuration, except for a reduction in size corresponding to the wall thickness of the ridge seal requiring a working gap of approximately 0.2 mm. The other, larger portion of the periphery of foot 13 is circular and concentric to the axis of the tubular shank 12, although its particular shape is of no concern with respect to the production of the ridge seal. In order to give the resulting recess in the workpiece an outer wall that extends as much as possible in the perpendicular direction, i.e. parallel to the tool-feed direction, the profiled side 17 of the electrode foot is tapered from the central area of the foot toward the profile contour.

The electrolyte guide structure 14 is formed of a block of insulating material such as synthetic plastic. Its junction face 18 with the foot 13 possesses a recess 19 of about 0.5 mm. depth which extends radially from the electrolyte inlet opening to the profiled side of the electrode foot at 17. The side of the guide structure 14 that faces the lateral side 120 of the turbine blade 125 is given a shape matching that of the blade profile and serves for adjusting the tool electrode and for providing a seal to prevent or impede the flow of electrolyte between the lateral electrode and blade walls extending parallel to the tool-feed direction.

The embodiment of the electrode according to the invention illustrated in FIGS. 2 and 4 is substantially similar to that described above with reference to FIGS. 1 and 3, except that the electrode foot 13 is constituted by a flat disc upon which a small plate member 122 is attached. The shape of plate 122 corresponds to that of the seal to be produced but is smaller by the wall thickness of the seal, corresponding to a working of 0.2 mm. The thickness of the plate 122 in the axial direction of the tubular shank wall corresponds to the desired depth of the recess to be produced in the workpiece. The plate 122 tapers from the working surface toward the planar base surface of the foot 13 in order to secure a sharper imaging, i.e. a better contour sharpness of the recess being produced.

The electrode and the turbine blade are adjusted relative to each other so that the electrode foot is located at a slight distance, about 1 mm., from the top face of the blade 125, and the profiled side of the electrolyte guide structure 14 is close to the corresponding blade profile. Then the electrolyte circulating pump is switched on. From the tubular shank 12 and the recess 19 in the guide structure 14 the electrolyte passes between the working surface area of the electrode foot and the front face of the turbine blade. Now the machining operation can commence by gradually feeding the tool electrode toward the workpiece until the resulting recess has reached the desired depth.

The operation just described applies to the production of unilateral ridge seals according to FIG. 3 as well as to the production of straddling ridge seals according to FIG. 4, both illustrations showing the ultimate position of the tool electrode at the conclusion of the forming process. The arrow 123 denotes the flow direction of the electorlyte, and the arrow 124 denotes the tool-feed direction. The workpiece (turbine blade) is assumed to remain in the illustrated position during the entire process, whereas the tool electrode advances downwardly toward the workpiece.

The invention, of course, is not limited to the production or machining of turbine blades. Similar manufacturing problems, for example the production of swallowtail grooves, shallow drop-forging dies or shallow injection molds can be readily produced by such tool electrodes according to the invention.

Upon a study of this disclosure it will further be obvious to those skilled in the art that our invention permits of various other modifications with respect to the shape and design of the tool electrodes as well as their particular application, and hence that the invention may be given embodiments other than particularly illustrated and described herein, without departing from the essential features of our invention and within the scope of the claims annexed hereto.

We claim:

1. An electrode device for electrochemical forming of unobstructed recesses in metallic workpieces, comprising a tubular shank whose axis extends in the tool-feed direction of the electrode and which forms an electrolyte supply duct, an electrode foot mounted at the other end of said shank and shaped to form an active electrolyte gap with the workpiece when in operation, an electrolyte guide structure of electrically non-conducting material mounted on said foot, said guide structure having a face adjacent to said foot and having in said face a recess communicating with said duct of said shank and having in the electrode feed direction a depth at least equal to the width of said gap, and said guide structure having a lateral surface portion extending parallel to said feed direction and facing a corresponding lateral side of the workpiece when the electrode is in operation, the shape of said lateral surface portion of said structure being adapted to that of said workpiece lateral side.

2. In an electrode device according to claim 1, said electrode foot having a planar base surface whose perimetric contour corresponds to that of the recess to be produced in the workpiece.

3. In an electrode device according to claim 1, said electrode foot having a planar base surface and having a projection extending axially away from said base surface, said projection having a perimetric contour corresponding to that of the recess to be produced in the workpiece.

References Cited

UNITED STATES PATENTS

| | | | |
|---|---|---|---|
| 3,445,372 | 5/1969 | Fromson | 204—284 |
| 3,268,434 | 8/1966 | Weingartner | 204—284 |

JOHN H. MACK, Primary Examiner

S. KANTER, Assistant Examiner

U.S. Cl. X.R.

204—224